Dec. 11, 1951    W. L. POLLARD    2,578,450
HYDRAULIC TRANSMISSION
Filed March 27, 1944
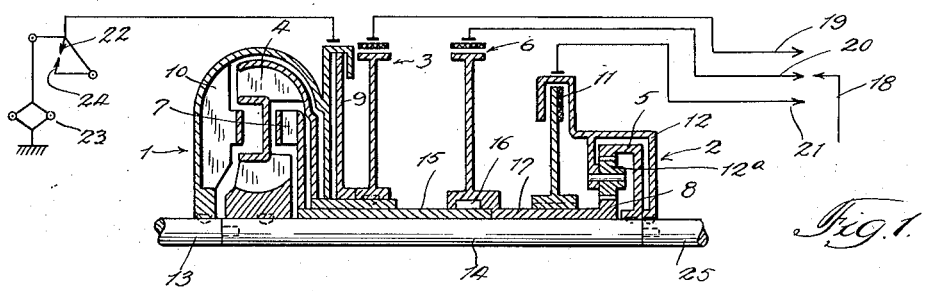
Fig. 1.
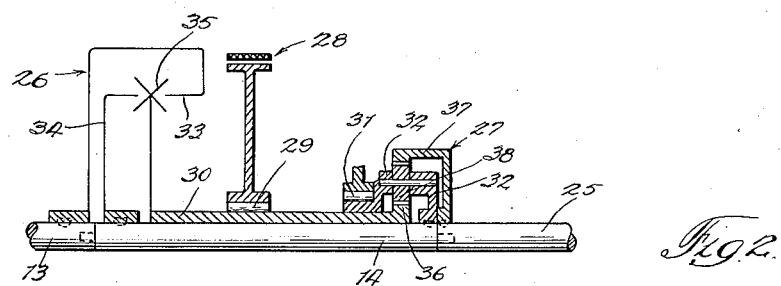
Fig. 2.
Fig. 3.
Fig. 4.
Fig. 5.
Inventor:
Willard L. Pollard
By Thiess, Olson & Mecklenburger
Attys.

Patented Dec. 11, 1951

2,578,450

UNITED STATES PATENT OFFICE 2,578,450

HYDRAULIC TRANSMISSION

Willard L. Pollard, Evanston, Ill.

Application March 27, 1944, Serial No. 528,208

17 Claims. (Cl. 74—732)

My invention relates to hydraulic transmissions.

One of the objects of my invention is to provide a hydraulic transmission which will have a wide torque ratio range and a high initial torque both in forward and reverse.

A further object of my invention is to provide such a construction comprising a pump rotor, two turbine rotors urged in opposite rotational directions by the pump rotor, a planetary gear construction having one of its elements connected to the forwardly driven turbine, and clutch means between one of the gear elements and the reversely driven turbine connectible to drive the gear element in reverse and disconnectible to enable the reversely driven turbine to rotate forwardly.

Further objects and advantages of the invention will be apparent from the description and claims.

In the drawings, in which several forms of my invention are shown.

Figs. 1, 2, 3, and 4 are axial sections showing different forms of my invention; and Fig. 5 is a view showing the torque, speed, and efficiency curves of the construction shown in Fig. 1.

Referring to the drawings in detail, and first to Fig. 1, the construction shown therein comprises a hydraulic torque converter 1, a planetary gear construction 2, a brake 3 for holding one of the turbines 4 and ring gear 5 against rotation, a brake 6 for holding the other turbine 7 and the sun gear 8 against rotation, a clutch 9 for connecting the turbine 4 and the ring gear 5 to rotate with the pump rotor 10, a clutch 11 for connecting the sun gear 8 to rotate with the gear carrier 12 carrying the planet gearing 12a, and control means for controlling the various clutches and brakes.

The pump rotor 10 may be connected with the motor shaft 13; the turbine 4 which rotates in the same direction as the pump rotor 10 may be connected to the intermediate shaft 14 to which the ring gear 5 is secured, and the reversely-rotating turbine 7 may be secured to a tubular shaft 15 having a one-way clutch connection 16 with the tubular shaft 17 to which the sun gear 8 is secured. This one-way clutch 16 is designed so that reverse rotation of the turbine 7 will cause reverse rotation of the sun gear 8.

The control apparatus shown only diagrammatically may comprise a movable electrical contact 18 which when in engagement with the contact 19 will cause the application of the brake 3; when in position intermediate the contacts 19 and 20 will enable the release of the brake 3; when in engagement with the contact 20 will cause the application of the brake 6; when in a position intermediate the contacts 20 and 21 will allow the brake 6 to be released, and when in engagement with the contact 21 will cause the application of the clutch 11. The control for the clutch 9 shown diagrammatically may comprise an electrical contact 22, the position of which may be controlled by a device 23 controlled by the speed of the vehicle, and an electrical contact 24, the position of which may be determined by the position of the throttle, such a construction being shown in my Patent No. 2,327,214.

The fluid torque converter may be of the general type shown in the patents to Dodge No. 2,303,829 or Van Lammeren No. 2,158,557.

In operation, it may be assumed that the control contact 18 will be set in neutral position between the contacts 19 and 20. The motor may be assumed to be running and the car standing still. If it is desired to back up the car, the contact 18 is brought into engagement with the contact 19 to apply the brake 3. This will hold the turbine 4 and ring gear 5 against rotation and will cause the turbine 7 to rotate in a direction reverse to that of the pump 10 at a relatively low-speed high-torque ratio. This will cause reverse rotation of the sun gear 8 and a slower higher torque reverse rotation of the gear carrier 12 carrying the planet gearing 12a and secured to the driven shaft 25. If it is desired to travel in a forward direction, the contact 18 is moved to neutral, releasing the brake 3 and thus preventing any power flow to the driven shaft 25, and is then moved to engage the forward contact 20 which causes the application of the brake 6. This prevents rotation of the turbine rotor 7 and sun gear 8 and causes forward rotation of the other turbine rotor 4 and ring gear 5. There will be a torque multiplication, both between the pump rotor 10 and the turbine rotor 4 and between the ring gear 5 and the driven shaft 25.

If it is desired to go into a higher speed, which may be considered an overdrive, the contact 18 is moved to engage the overdrive contact 21, thus releasing the brake 6 and applying the clutch 11. This gives a direct drive between the pump rotor 10 and the driven shaft 25.

The speed efficiency torque curves which may be obtained from this construction, using a highly efficient hydraulic unit, are shown in Fig. 5. These curves are based on the assumption that the torque converter will have a maximum torque increase between the pump rotor and the turbine rotor of 5:1. Using a formula for computing the points on the torque and efficiency curves of the reversely-rotating turbine, the torque curve A and efficiency curve B are obtained. The points on the forward speed torque and efficiency curves are obtained from the characteristic curves of the hydraulic unit, using formulas for the torque increase due to the planetary gear construction and assuming that the ratio of the sun gear to ring gear diameters is approximately 1:2. The part of the forward drive torque curve from C to D is the torque on the driven shaft 25 when the ring gear 5 is connected to rotate with the pump rotor 10 and the sun gear 8 is held against rotation by the brake 6. Under these conditions, the turbine rotor 7 is free to rotate forwardly at the same speed as the pump rotor, due to the one-way clutch 16. That part of the forward speed torque curve from E to F is the torque delivered when both clutches 9 and 11 are connected so that the sun gear and the ring gear both rotate as a unit with the pump rotor, consequently giving a direct drive in which the torque on the driven shaft is the same as the motor torque.

It will be noted that when the contact 18 is in neutral position, there is no tendency for the car to creep, since both brakes 3 and 6 are off and no power can be transmitted from the motor to the driven shaft 25.

The construction shown in Fig. 2 comprises a drive shaft 13, a driven shaft 25, an intermediate shaft 14, a hydraulic torque converter 26, a planetary gear construction 27, a brake 28 having a one-way clutch connection 29 with the tubular shaft 30, and a one-way anchor 31 for holding the gear carrier 32 against reverse rotation. The torque converter comprises a pump rotor 33 secured to the motor shaft 13, a turbine rotor 34 rotatable in the same direction as the pump rotor 33 and secured to the intermediate shaft 14, and a reversely rotatable turbine 35 secured to the tubular shaft 30 to which the sun gear 36 is secured. This construction is designed to give two forward drives of different torque ranges.

For high-torque low-speed ratio, the brake 28 is released. Assuming that the car is initially standing still and that the motor speed is gradually increasing, the effect of the pump rotor 33 on the turbine rotor 34 will be to tend to cause it to rotate in the same direction as the pump rotor, and the effect of the pump rotor on the other turbine rotor 35 will be to tend to rotate it in a reverse direction to that of the pump rotor. Due to the pitch ratio of the sun gear 36 and ring gear 37, the torque resistance to forward rotation of the turbine rotor 34 will be about three times as great as the torque resistance to reverse rotation of the other turbine rotor 35. From the characteristic curves of the torque converter, the result will be that the first turbine rotor 34 will not be able to rotate in a forward direction but will be held against reverse rotation by the one-way anchor 31 and that the reversely-rotatable turbine 35 will rotate in a reverse direction, causing reverse rotation of the sun gear 36 and hence forward rotation of the ring gear 37. The initial reverse torque on the turbine 35 may be assumed to be about four times the torque of the pump rotor 33. If the ratio of sun gear 36 to ring gear 37 is about 1:2, there will be an additional torque multiplication here of 2:1. The combined initial torque ratio of the converter and the planetary will be the product of the above ratios, or about 8:1.

As the load on the driven shaft lessens, it will become desirable to change the hydraulic converter action by applying the brake 28. This will hold the turbine 35 and the sun gear 36 against reverse rotation through the action of the one-way clutch 29. This will cause the reversely rotatable turbine 35 to act as a reactance member and will cause a forward high torque rotation of the other turbine rotor 34 and of the intermediate shaft 14 and gear carrier 32. This will give an overdrive of the ring gear 37 with respect to the intermediate shaft 14. As the load on the driven shaft 25 decreases, the reverse pressure on the sun gear 36 and turbine 35 will decrease, and when this decreases to a point at which it is less than the forward urge of the planet gearing 38 on the sun gear 36, the turbine rotor will begin to rotate in a forward direction, as described in my Patent No. 2,293,358. This automatically causes the converter 26 to transform into coupler action at a high point on the efficiency curve of the converter as explained in my above patent.

It is inherent in the construction of Fig. 2 that if the car is initially standing still and the motor speed is gradually increasing and the brake 28 be not applied that the reverse torque on the turbine 35, due to converter action, will become less than the forward torque thereon occasioned by the planetary gear construction 27. At this stage the converter action will be transformed to a coupler action.

The construction shown in Fig. 2 might be useful where a high initial torque ratio between the drive shaft and driven shaft is required, as in prime movers, tanks, etc.

The construction shown in Fig. 3 is substantially the same as that just described as to the hydraulic torque converter 26, the planetary gearing 27, the drive shaft 13, the intermediate shaft 14, the driven shaft 25, the brake 28, one-way clutch 29 and one-way anchor 31.

In this form, however, means are provided for effecting a reverse drive in addition to the two forward drive ratios. In this form a brake 39 is provided for holding the gear carrier against rotation, and a dog clutch construction 40 is provided for effecting reverse. This comprises two dog clutch sleeves 41 and 42 having a swivel connection with each other so that both are moved together by means of the clutch shifting lever 43. In one position, as shown, the inner dog clutch sleeve 41 connects the tubular shaft 44 to which the turbine 34 is secured with the intermediate shaft 14 to which the gear carrier 32 is secured, and the outer clutch sleeve 42 connects the tubular shaft 45 secured to the turbine 35 with the tubular shaft 46 which is secured to the sun gear 36. In its other rearward position, the inner clutch sleeve 41 connects the tubular shaft 44 on which the turbine 34 is mounted with the tubular shaft 46 on which the sun gear 36 is mounted. The outer clutch sleeve 42 in this position does not connect any relatively movable parts. In the position of the dog clutch shown, which is that for forward drive, if it is desired to have the high-torque low-speed forward drive, the brakes 28 and 39 are released. The one-way anchor 31 holds the gear carrier 32 and turbine 34 against reverse rotation. With this construction, the reversely-rotatable turbine 35 will be driven at a slow-speed high-torque ratio and this reverse rotation will be communicated to the sun gear 36 through the outer clutch sleeve 42. As the gear carrier 32 is held against reverse rotation by the one-way anchor 31, the ring gear 37 will be rotated in a forward direction at an increased torque ratio, which with an efficient torque converter, may be as high as 8:1.

To change the forward speed ratio, the brake 28 is applied which holds the reversely rotatable turbine 35 against reverse rotation. This causes forward rotation of the turbine rotor 34 at initially slow-speed high-torque ratio. This causes forward rotation of the gear carrier 32 and causes an overdrive of the ring gear 37 and driven shaft 25, as in the form shown in Fig. 2. When the load resistance on the driven shaft 25 falls so that the reverse reaction on the turbine 35 is less than the forward urge of the planet gearing 38 on the sun gear 36, the converter will be transformed to coupler action as in Fig. 2.

For reverse, the clutch sleeves 41 and 42 are slipped to the rear position in which the turbine rotor 34 is connected with the sun gear 36 and the other turbine rotor 35 is disconnected from the sun gear. The two brakes 28 and 39 are applied, the brake 28 preventing reverse rotation of the turbine rotor 35 and the brake 39 preventing any rotation of the gear carrier 32. Under these conditions the turbine rotor 34 causes forward rotation of the sun gear 36, which, in turn, causes reverse rotation of the ring gear 37 and driven shaft 25. This reverse rotation of the ring gear will be slow-speed high-torque, the torque ratio between the motor shaft 13 and driven shaft 25 being approximately 10:1, with an efficient type of hydraulic converter.

The construction shown in Fig. 4 may be substantially the same as that shown in Fig. 3 so far as the hydraulic converter 26, the brake 28, one-way clutch 29, drive shaft 13, intermediate shaft 14, driven shaft 25, tubular shafts 44, 45, and 46, the dog clutch construction 40, the one-way anchorage 31, the brake 39, and planetary gearing 27 are concerned. In addition, there is provided a brake 47 and one-way clutch 48 which may be used for holding the sun gear 36 against rotation to effect an overdrive when desired. The construction and operation, so far as the reverse, high-torque forward, and intermediate-torque forward are concerned, are the same as in Fig. 3. The one-way clutch 48 is provided between the dog clutch ring 49 and the tubular shaft 45 on which the reversely-rotatable turbine 35 is mounted, in order that overdrive may be effected without causing this reversibly-rotatable turbine to exert a drag.

Assuming that the load on the driven shaft 25 has become such that the hydraulic converter has been transformed to coupler action, an overdrive may be effected by applying the brake 47, holding the sun gear 36 against rotation without interfering with forward rotation of the turbine 35. This will effect an overdrive of the ring gear 37 and driven shaft 25 with respect to the gear carrier 32.

This construction of Fig. 4 will give efficiency torque and speed curves for both forward and reverse, which will approximate those shown in Fig. 5 and exemplified in Fig. 1, except that the initial forward torque will be somewhat greater in the construction of Fig. 4 than in that of Fig. 1, and the initial reverse torque will be somewhat less.

Tests on torque converters have shown an initial torque ratio in the hydraulic unit of about 5:1. With this ratio and a ratio of the pitch diameters of sun gear and ring gear of 1:2, the construction of Fig. 1 would give an initial reverse torque ratio of about 12:1 and an initial forward torque ratio of about 7.5:1. Even if the torque converter unit had an initial torque ratio of only 2.5:1, the construction of Fig. 1 would give a reverse overall initial torque ratio of 4.5:1 and an initial forward overall torque ratio of 3.75:1.

Further modifications will be apparent to those skilled in the art and it is desired, therefore, that the invention be limited only by the scope of the appended claims.

Having thus described my invention, what I claim and desire to secure by Letter Patent is:

1. A hydro-planetary gear construction comprising a hydraulic torque converter and a planetary gearing, said torque converter comprising a pump rotor and two turbines, a first one of said turbines being driven in the same direction as the pump rotor when the second turbine is held against reverse rotation and the second turbine being driven in a direction reverse to that of the pump rotor when said first turbine is held against rotation, said planetary gearing comprising at least three elements including (1) a first gear, (2) a second gear, and (3) a differential gearing geared to both of said gears, means connecting said first gear in force-transmission relation to said first turbine, and clutch means between said second turbine and said second gear connectible to enable said second turbine to drive said second gear in a direction reverse to that of the pump rotor and disconnectible to enable said second turbine to precess with respect to said second gear in a forward direction, said transmission having means for alternatively either holding said first turbine against forward rotation or said second gear against reverse rotation.

2. A hydro-planetary gear construction comprising a hydraulic torque converter and a planetary gearing, said torque converter comprising a pump rotor and two turbines, a first one of said turbines being driven in the same direction as the pump rotor when the second turbine is held against reverse rotation and the second turbine being driven in a direction reverse to that of the pump rotor when said first turbine is held against rotation, said planetary gearing comprising at least three elements including (1) a first gear, (2) a second gear, and (3) a differential gearing geared to both of said gears, means connecting said first gear in force-transmission relation to said first turbine, and one-way clutch means between said second turbine and said second gear connectible to enable said second turbine to drive said second gear in a direction reverse to that of the pump rotor and disconnectible to enable said second turbine to precess with respect to said second gear in a forward direction, said transmission having means for alternatively either holding said first turbine against forward rotation or said second gear against reverse rotation.

3. A hydro-planetary gear construction comprising a hydraulic torque converter and a planetary gearing, said torque converter comprising a pump rotor and two turbines, a first one of said turbines being driven in the same direction as the pump rotor when the second turbine is held against reverse rotation and the second turbine being driven in a direction reverse to that of the pump rotor when said first turbine is held against rotation, said planetary gearing comprising at least three elements including (1) a first gear, (2) a second gear, and (3) a differential gearing geared to both of said gears, means connecting said first gear in force-transmission relation to said first turbine, clutch means between said second turbine and said second gear connectible to enable said second turbine to drive said second gear in a direction reverse to that of the pump rotor and disconnectible to enable said second turbine to precess with respect to said second gear in a forward direction, said transmission having means for alternatively either holding said first turbine against forward rotation or said second gear against reverse rotation, and clutch means for connecting and disconnecting said gears with respect to each other.

4. A hydro-planetary gear construction comprising a hydraulic torque converter and a planetary gearing, said torque converter comprising a pump rotor and two turbines, a first one of said turbines being driven in the same direction as the pump rotor when the second turbine is held against reverse rotation and the second turbine being driven in a direction reverse to that of the pump rotor when said first turbine is held against rotation, said planetary gearing comprising at least three elements including (1) a first gear, (2) a second gear, and (3) a differential gearing geared to both of said gears, means connecting said first gear in force-transmission relation to said first turbine, clutch means between said second turbine and said second gear connectible to enable said second turbine to drive said second gear in a direction reverse to that of the pump rotor and disconnectible to enable said second turbine to precess with respect to said second gear in a forward direction, said transmission having means for alternatively either holding said first turbine against forward rotation or said second gear against reverse rotation, and clutch means for connecting said first turbine rotor with respect to said pump rotor.

5. A hydro-planetary gear construction comprising a hydraulic torque converter and a planetary gearing, said torque converter comprising a pump rotor and two turbines, a first one of said turbines being driven in the same direction as the pump rotor when the second turbine is held against reverse rotation and the second turbine being driven in a direction reverse to that of the pump rotor when said first turbine is held against rotation, said planetary gearing comprising at least three elements including (1) a first gear, (2) a second gear, and (3) a differential gearing geared to both of said gears, means connecting said first gear in force-transmission relation to said first turbine, clutch means between said second turbine and said second gear connectible to enable said second turbine to drive said second gear in a direction reverse to that of the pump rotor and disconnectible to enable said second turbine to precess with respect to said second gear in a forward direction, said transmission having means for alternatively either holding said first turbine against forward rotation or said second gear against reverse rotation, clutch means for connecting and disconnecting said gears with respect to each other, and clutch means for connecting said first turbine rotor with respect to said pump rotor.

6. A hydro-planetary gear construction comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said planetary gearing comprising at least three elements including (1) a first gear, (2) a second gear, and (3) a differential gearing element geared to both of said gears, releasable means for holding said differential gearing element against rotation, releasable means for connecting said other turbine with one of said gears, and means for alternatively connecting said one turbine either with said one gear or with said differential gearing element.

7. A hydro-planetary gear construction comprising hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission having means for alternatively either holding said one turbine against forward rotation or said other turbine against reverse rotation, said planetary gearing comprising at least three elements including (1) a first gear, (2) a second gear, and (3) a differential gearing element geared to both of said gears, means connecting said differential gearing element in force-transmission relation to one of said turbines, and means for alternatively either connecting one of said gears with said other of said turbines or disconnecting said one of said gears from said other turbine and holding it against rotation.

8. A hydro-planetary gear construction comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said planetary gearing comprising at least three elements including (1) a first gear, (2) a second gear, and (3) a differential gearing element geared to both of said gears, releasable means for holding said differential gearing element against rotation, releasable means for connecting said other turbine with one of said gears, means for alternatively connecting said one turbine either with said one gear or with said differential gearing element, and means for holding said one of said gears against rotation when released from said other turbine.

9. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission having means for releasably holding said turbines against said rotations, said planetary gearing comprising at least three elements including (1) a first gear, (2) a second gear, and (3) a reversing differential gearing element geared to both of said gears whereby, when held against rotation, reverse rotation of one of said gears will cause forward rotation of the other of said gears, means connecting one of said gears in force-transmission unisonal relation on said one of said turbines, means connecting the other of said gears in force-transmission unisonal relation to the said other of said turbines, and means for connecting said pump rotor and one of said turbines to rotate in unison.

10. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission having means for releasably holding said turbines against said rotations, said planetary gearing comprising at least three elements including (1) a first gear, (2) a second gear, and (3) a reversing differential gearing element geared to both of said gears whereby, when held against rotation, reverse rotation of one of said gears will cause forward rotation of the other of said gears, means connecting one of said gears in force-transmission unisonal relation to said one of said turbines, means connecting the other of said gears in force-transmission unisonal relation to the said other of said turbines, and means for connecting said pump rotor and turbines to rotate in unison.

11. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation, said transmission having releasable means for holding said other turbine against reverse rotation, said planetary gearing comprising at least three elements including (1) a first gear, (2) a second gear, and (3) a reversing differential gearing element geared to both of said gears whereby, when held against rotation, reverse rotation of one of said gears will cause forward rotation of the other of said gears, means connecting one of said gears in force-transmission unisonal relation to said one of said turbines, means connecting the other of said gears in force-transmission unisonal relation to the other of said turbines, and clutch means for connecting said turbines and pump rotor to rotate in unison.

12. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation, said transmission having releasable one-way anchorage means for holding said other turbine against reverse rotation, said planetary gearing comprising at least three elements including (1) a first gear, (2) a second gear, and (3) a reversing differential gearing element geared to both of said gears whereby, when held against rotation, reverse rotation of one of said gears will cause forward rotation of the other of said gears, means connecting one of said gears in force-transmission unisonal relation to said one of said turbines, means connecting the other of said gears in force-transmission unisonal relation to the other of said turbines, and clutch means for connecting said turbines and pump rotor to rotate in unison.

13. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission having means for releasably holding said turbines against said rotations and means for connecting said first turbine to rotate in unison with the pump rotor, said planetary gearing comprising at least three elements including (1) a first gear, (2) a second gear, and (3) a differential gearing element geared to both of said gears, means connecting one of said elements in force-transmission unisonal relation to said one of said turbines, means connecting another of said elements in force-transmission unisonal relation to the other of said turbines.

14. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission having means for releasably holding said turbines against said rotations and means for connecting said turbines to rotate in unison with the pump rotor, said planetary gearing comprising at least three elements including (1) a first gear, (2) a second gear, and (3) a differential gearing element geared to both of said gears, means connecting one of said elements in force-transmission unisonal relation to said one of said turbines, means connecting another of said elements in force-transmission unisonal relation to the other of said turbines.

15. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission means having means for releasably holding said turbines against said rotations, said planetary gearing comprising at least three elements including (1) a first gear, (2) a second gear, and (3) a differential gearing element geared to both of said gears, means connecting one of said elements with said one turbine, means connecting another of said elements with said other turbine, and means for connecting one of said turbine-connected elements to rotate in unison with said pump rotor.

16. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission means having means for releasably holding said turbines against said rotations, said planetary gearing comprising at least three elements including (1) a first gear, (2) a second gear, and (3) a differential gearing element geared to both of said gears, means connecting one of said elements with said one turbine, means connecting another of said elements with said other turbine, and means for connecting both of said turbine-connected elements to rotate in unison with said pump rotor.

17. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission means having means for releasably holding said turbines against said rotations, said planetary gearing comprising at least three elements including (1) a first gear, (2) a second gear, and (3) a differential gearing element geared to both of said gears, means connecting one of said elements with said one turbine, means connecting another of said elements with said other turbine, and means for connecting both of said turbine-connected elements to rotate in unison with said pump rotor comprising a one-way clutch acting between said turbine-connected elements.

WILLARD L. POLLARD.

REFERENCES CITED

The following references are of record in the file of this patent:

UNITED STATES PATENTS

| Number | Name | Date |
|---|---|---|
| 2,158,557 | Van Lammeren | May 16, 1939 |
| 2,293,358 | Pollard | Aug. 18, 1942 |
| 2,308,547 | Schneider | Jan. 19, 1943 |
| 2,322,251 | Pollard | June 22, 1943 |
| 2,351,213 | James | June 13, 1944 |
| 2,352,004 | Pollard | June 20, 1944 |
| 2,360,646 | Carnagua | Oct. 17, 1944 |